United States Patent Office 2,886,562
Patented May 12, 1959

2,886,562

DISAZO DYESTUFFS

Carl Taube, Leverkusen-Bayerwerk, Germany, assignor to Farbenfabriken Bayer Aktiengesellschaft, Leverkusen, Germany, a corporation of Germany No Drawing. Application June 29, 1956
Serial No. 594,700

Claims priority, application Germany August 11, 1955

3 Claims. (Cl. 260—161)

The present invention relates to disazo dyestuffs and to a process for their manufacture; more particularly, it relates to disazo dyestuffs of the following formula:

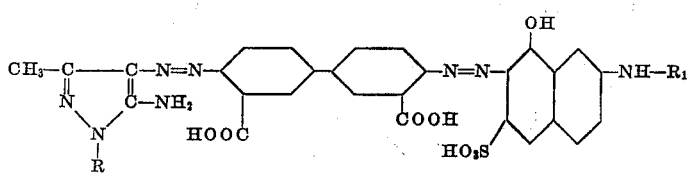

wherein R stands for an aryl radical and $R_1$ means hydrogen, alkyl or aryl.

It is an object of the present invention to provide new disazo dyestuffs of good fastness properties. It is a further object to provide new disazo dyestuffs which can be treated with copper salts.

The new disazo dyestuffs are obtainable by coupling tetrazotized 4,4'-diamino-3,3'-dicarboxy-diphenyl with 1 mol of a 1-aryl-3-methyl-5-aminopyrazol which may be substituted in the aryl nucleus e.g. by sulfonic or carboxylic acid groups and combining the diazo-monoazo dyestuff thus obtained with 2-amino-8-hydroxy-naphthalene-6-sulfonic acid or its N-alkyl or N-aryl-derivatives. The resultant diazo dyestuffs can be converted into their copper complexes by after-treatment with copper salts.

The dyestuffs dissolve in water with dark brown coloration and yield dark brown dyeings on cotton and regenerated cellulose, which become fast to light and washing by after-treatment with copper salts.

The following examples are given for the purpose of illustrating the invention, without, however, limiting it thereto.

Example 1

27.2 g. (0.1 mol) of 4,4'-diamino-3,3'-dicarboxy-diphenyl are tetrazotized as usual in 500 ml. of ice-water with 13.8 g. of sodium nitrite and 55 ml. of hydrochloric acid. To the tetrazo salt solution there is added an aqueous suspension of 30.3 g. (0.1 mol) of 1-(8'-sulfo-2'-naphthyl)-3-methyl-5-aminopyrazol; the reaction mixture is adjusted to a pH-value of 8 to 9 by addition of sodium bicarbonate. The dark half-sided coupling product soon precipitates. It is isolated as soon as no tetrazo compound can be detected any longer. The diazo monoazo dyestuff thus obtained is mixed within 12 hours with 31.5 g. (0.1 mol) of 2-phenylamino-8-hydroxy-naphthalene-6-sulfonic acid in 1000 ml. of ice-water and 50 g. of soda. The reaction mixture is then heated to 50° C. and the disazo dyestuff of the following formula:

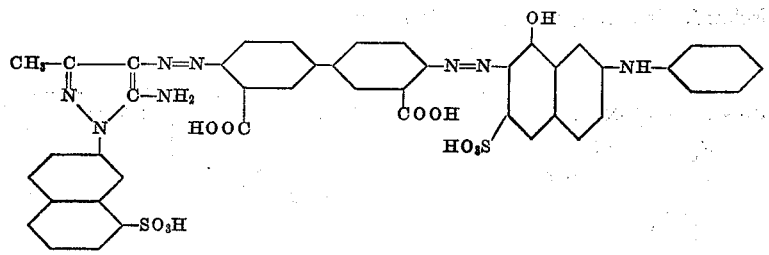

is isolated. It dyes cotton and regenerated cellulose in dark brown shades, which become fast to light and washing by treatment with copper salts.

Dyestuffs of similar dyeing properties are obtained if, instead of 1-(8'-sulfo-2'-naphthyl)-3-methyl-5-aminopyrazol, equivalent parts of 1-(3'-sulfo-1'-phenyl)-3-methyl-5-amino-pyrazol, 1 - (4' - sulfo-1'-phenyl) - 3 - methyl-5-aminopyrazol or the aminopyrazol of chloroaniline-mono-sulfonic acid or the aminopyrazol of 4-aminobenzoic acid are used. Instead of 2-phenyl-amino-8-hydroxynaphthalene-6-sulfonic acid, 2-methylamino-, 2-p-tolylamino- or 2-p-anisidylamino-8-hydroxy-naphthalene-6-sulfonic acid can also be used as azo compounds.

Example 2

27.2 g. (0.1 mol) of 4,4'-diamino-3,3'-dicarboxy-diphenyl are tetrazotized in usual manner in 500 ml. of ice-water with 13.8 g. of sodium nitrite and 55 ml. of hydrochloric acid. Into this solution there are introduced 17.3 g. (0.1 mol) of 1-phenyl-3-methyl-5-amino-pyrazol which is dissolved in 200 ml. of water and 15 ml. of hydrochloric acid. The solution is neutralized at 10° C. with aqueous sodium acetate solution to a pH-value of 4–5 and stirred with cooling until the tetrazo compound cannot be detected any longer. The isolated diazo-azo compound is added to a solution of 48.6 g. (0.1 mol) of 2-(4'-amino-3'-sulfodiphenylamino)-8-hydroxy-naphthalene-6-sulfonic acid in 1500 ml. of ice-water and 100 g. of soda. The mixture is stirred over night, then heated to 50° C. and the disazo dyestuff is isolated. It corresponds to the formula:

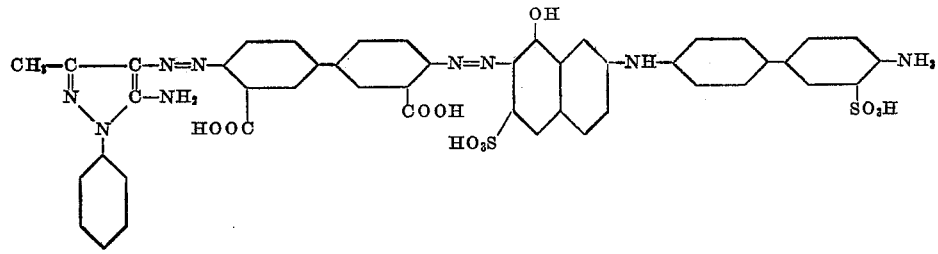

and dyes cotton and regenerated cellulose in red-brown shades which become fast to light and washing by treatment with after-salts.

I claim:

1. A disazo dyestuff corresponding to the formula:

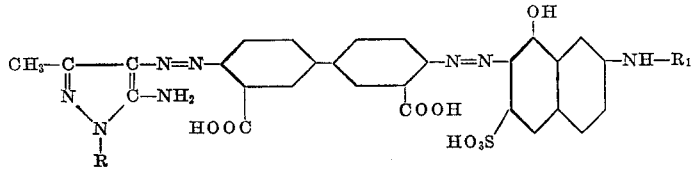

wherein R stands for a member selected from the group consisting of radicals of the benzene and naphthalene series and $R_1$ means a member selected from the group consisting of hydrogen, lower alkyl and a benzene radical containing a single benzene nucleus and a diphenyl radical.

2. The disazo dyestuff corresponding to the formula:

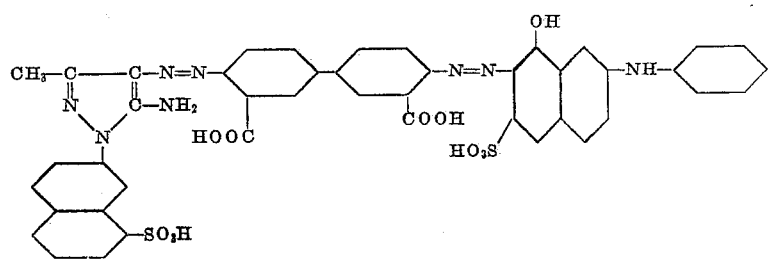

3. The disazo dyestuff corresponding to the formula:

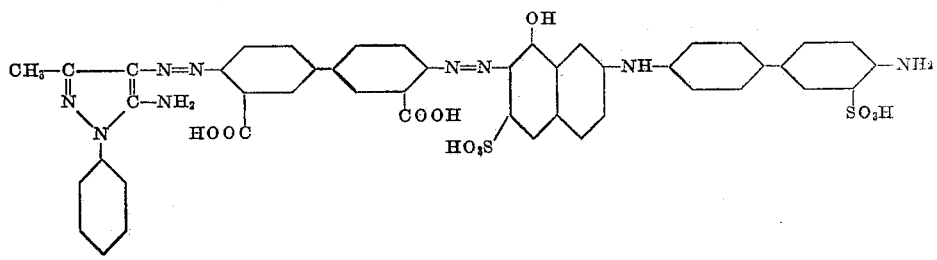

References Cited in the file of this patent

UNITED STATES PATENTS

| | | |
|---|---|---|
| 2,241,796 | Taube et al. | May 13, 1941 |
| 2,384,419 | Fleischhauer et al. | Sept. 4, 1945 |
| 2,426,977 | Straub et al. | Sept. 9, 1947 |

FOREIGN PATENTS

| | | |
|---|---|---|
| 745,461 | Germany | Mar. 13, 1944 |